(12) United States Patent
Ji et al.

(10) Patent No.: US 9,378,753 B2
(45) Date of Patent: Jun. 28, 2016

(54) SELF-ORGANIZED ACOUSTIC SIGNAL CANCELLATION OVER A NETWORK

(71) Applicant: AT&T Intellectual Property I, L.P., Atlanta, GA (US)

(72) Inventors: Lusheng Ji, Randolph, NJ (US); Donald J. Bowen, Madison, NJ (US); Dimitrios B. Dimitriadis, Rutherford, NJ (US); Horst J. Schroeter, New Providence, NJ (US)

(73) Assignee: AT&T INTELLECTUAL PROPERTY I, L.P, Atlanta, GA (US)

( * ) Notice: Subject to any disclaimer, the term of this patent is extended or adjusted under 35 U.S.C. 154(b) by 57 days.

(21) Appl. No.: 14/529,974

(22) Filed: Oct. 31, 2014

(65) Prior Publication Data
US 2016/0125894 A1 May 5, 2016

(51) Int. Cl.
*A61F 11/06* (2006.01)
*G10K 11/16* (2006.01)
(Continued)

(52) U.S. Cl.
CPC ........ *G10L 21/0216* (2013.01); *G10K 11/1784* (2013.01); *G10K 2210/111* (2013.01); *G10K 2210/3045* (2013.01); *G10L 2021/02166* (2013.01)

(58) Field of Classification Search
CPC .................. G10L 21/0216; G10L 2021/02166; G10K 11/1784; G10K 2210/111; G10K 2210/3045
USPC ........................................................ 381/71.1
See application file for complete search history.

(56) References Cited

U.S. PATENT DOCUMENTS

| | | |
|---|---|---|
| 6,937,978 B2 | 8/2005 | Liu |
| 7,174,291 B2 * | 2/2007 | McArthur ........... G10L 21/0208 381/94.3 |

(Continued)

FOREIGN PATENT DOCUMENTS

| | | |
|---|---|---|
| WO | 2006066618 | 6/2006 |
| WO | 2011149969 | 12/2011 |
| WO | 2012162182 | 11/2012 |

OTHER PUBLICATIONS

Lee et al., "SocioPhone: Everyday Face-To-Face Interaction Monitoring Platform Using Multi-Phone Sensor Fusion," Proceeding of the 11th annual international conference on Mobile systems, applications, and services. ACM, 2013, http://plash2.iis.sinica.edu.tw/redmine/attachments/download/392/%5BLee%202013%5D%20SocioPhone.pdf.

*Primary Examiner* — Paul S Kim
(74) *Attorney, Agent, or Firm* — Akerman LLP; Michael K. Dixon; Mammen (Roy) P. Zachariah, Jr.

(57) ABSTRACT

A system for self-organized acoustic signal cancellation over a network is disclosed. The system may transmit an acoustic sounding signal to an interfering device so that a channel measurement may be performed for a channel between the interfering device and an interferee device. The system may receive the channel measurement for the channel from the interfering device and also receive a digitized version of an audio interference signal associated with the interfering device. Based on the channel measurement and the digital version of the interference signal, the system may calculate a cancellation signal prior to the arrival of the original over-the-air audio interference signal that corresponds to the digital version of audio interference signal. The system may then apply the cancellation signal to an audio signal associated with the interferee device to remove the interference signal from the audio signal.

20 Claims, 4 Drawing Sheets

(51) Int. Cl.
  *H03B 29/00* (2006.01)
  *G10L 21/0216* (2013.01)
  *G10K 11/178* (2006.01)

(56) References Cited

U.S. PATENT DOCUMENTS

| | | | |
|---|---|---|---|
| 8,275,141 B2 | 9/2012 | Pan et al. | |
| 8,467,543 B2 | 6/2013 | Burnett et al. | |
| 8,510,106 B2 | 8/2013 | Li et al. | |
| 8,515,089 B2 | 8/2013 | Nicholson | |
| 8,560,307 B2 | 10/2013 | El-maleh et al. | |
| 2011/0091047 A1 | 4/2011 | Konchitsky et al. | |
| 2012/0185246 A1 | 7/2012 | Zhang et al. | |
| 2013/0259250 A1 | 10/2013 | Nicholson et al. | |
| 2013/0272540 A1 | 10/2013 | Ahgren et al. | |
| 2014/0023199 A1 | 1/2014 | Giesbrecht | |

* cited by examiner

SELF-ORGANIZED ACOUSTIC SIGNAL CANCELLATION OVER A NETWORK

FIELD OF THE INVENTION

The present application relates to technologies for noise cancellation, noise suppression, and acoustics, and more particularly, to systems and methods for self-organized acoustic signal cancellation over a network.

BACKGROUND

Currently, end users regularly utilize smartphones, computing devices, and other communications-based technologies to place and receive phone calls, access various types of content and services, perform a variety of functions, or a combination thereof. When an end user attempts to communicate using such devices and technologies, the end user is often located in a shared-space environment, such as, but not limited to, a park, an office, a passenger car, a train, a bus, an airport, or a mall. Such environments may include ambient noises, such as, but not limited to, noises generated from vehicles, machinery, and animals that may potentially interfere with the end user's communications. Additionally, such environments may also include interfering end users, who may be making concurrent phone calls or other communications that may interfere with the communications made by the end user. In such a scenario, each end user's voice signals will propagate through the air, reach other nearby end users, be picked up by the microphones of the nearby end users' devices, and become undesired input signals for the nearby end users. This problem typically falls in the general category known as multi-talker speech separation or blind source separation.

Currently, in order to counteract or cancel such ambient noise and interfering end users, noise cancellation algorithms and technologies have been utilized to separate a targeted end user's audio signals from the ambient noise and audio signals generated by the interfering end users. However, current noise suppression algorithms and technologies typically require predefining the locations of the sources of the ambient noise, the location of the targeted end user, and the locations of interfering end users. While the use of microphone arrays may assist in counteracting the interfering audio signals via dynamic acoustic beam steering, microphone arrays are often impractical and expensive, particularly in the context of shared-space environments. As a result, currently existing noise cancellation technologies do not provide an optimal and cost-effective solution for end users.

SUMMARY

A system and accompanying methods for self-organized acoustic signal cancellation over a network are disclosed. The system and methods take advantage of the fact that electromagnetic waves propagate through air significantly faster than acoustic waves. In particular, the system and methods involve capturing, such as in a shared-space environment, an interference audio signal at the location where the interference audio signal is generated so that a digital version of the interference audio signal may be sent to a device of a user located at an interference point. A cancellation signal corresponding to the interference signal may be calculated prior to the arrival of the interference signal at the device of the user, and the cancellation signal may be applied to an outgoing audio signal coming from the device of the user so as to produce a better quality outgoing audio signal.

In order to accomplish this, the system and methods may include enabling the device of the user (i.e. an interferee device) to discover other nearby devices that may potentially interfere with communications associated with the device of the user. For example, the system and methods may involve utilizing a protocol, such as audio-radio cooperation protocol, to enable each of the devices to broadcast each of their identities on a communications channel to each other. Once the identities are shared among the devices, the system and methods may include transmitting an acoustic sounding signal to each of the devices that may potentially interfere with the device of the user. Using the acoustic sounding signal, each of the potentially interfering devices may conduct a channel measurement for a channel between each potentially interfering device and the device of the user. Once the channel measurements are conducted, each of the potentially interfering devices may transmit their corresponding channel measurements to the device of the user. Additionally, each of the potentially interfering devices may transmit digital versions of interference signals associated with each of the interfering devices to the device of the user.

Upon receipt of the channel measurements and the digital versions of the interference signals, the system and methods may calculate cancellation signals based on the channel measurements and the digital versions of the interference signals. Notably, the calculation may be performed prior to the arrival of the actual interference signals at the device of the user. Once the calculations of the cancellation signals are performed, the system and method may include applying the cancellation signals to an audio signal associated with the device of the user so as to remove, or otherwise reduce, the effect of the actual interference signals on the audio signal. As a result, the system and methods may enhance communications conducted using the device of the user.

In one embodiment, a system for self-organized acoustic signal cancellation over a network is disclosed. The system may include a memory that stores instructions and a processor that executes the instructions to perform various operations of the system. The system may perform an operation that includes transmitting an acoustic sounding signal to an interfering device. The acoustic sounding signal may be utilized to perform a channel measurement for a channel between the interfering device and an interferee device. The interfering device may generate or otherwise be associated with an interference signal. The system may then perform an operation that includes receiving, from the interfering device, the channel measurement for the channel between the interfering device and the interferee device. Additionally, the system may perform an operation that includes receiving a digitized version of the interference signal associated with the interfering device. Furthermore, the system may perform an operation that includes calculating a cancellation signal based on the digitized version of the interference signal and based on the channel measurement. The cancellation signal may be calculated prior to the interference signal's arrival at the interferee device. Moreover, the system may perform an operation that includes applying the cancellation signal to an audio signal associated with the interferee device in order to remove the interference signal from the audio signal.

In another embodiment, a method for self-organized acoustic signal cancellation over a network is disclosed. The method may include utilizing a memory that stores instructions, and a processor that executes the instructions to perform the various functions of the method. The method may include transmitting an acoustic sounding signal to an interfering device. The acoustic sounding signal may be utilized to perform a channel measurement for a channel between the interfering device and an interferee device. The interfering device may generate or be otherwise associated with an interference signal. Additionally, the method may include receiving, from the interfering device, the channel measurement for the channel between the interfering device and the interferee device. The method may also include receiving a digitized version of the interference signal associated with the interfering device. Furthermore, the method may include calculating a cancellation signal based on the digitized version of the interference signal and based on the channel measurement. The cancellation signal may be calculated prior to the interference signal's arrival at the interferee device. Finally, the method may include applying the cancellation signal to an audio signal associated with the interferee device in order to remove the interference signal from the audio signal.

According to yet another embodiment, a computer-readable device having instructions for self-organized acoustic signal cancellation over a network is provided. The computer instructions, which when loaded and executed by a processor, may cause the processor to perform operations including: transmitting an acoustic sounding signal to an interfering device, wherein the acoustic sounding signal is utilized to perform a channel measurement for a channel between the interfering device and an interferee device, and wherein the interfering device is associated with an interference signal; receiving, from the interfering device, the channel measurement for the channel between the interfering device and the interferee device; receiving a digitized version of the interference signal associated with the interfering device; calculating a cancellation signal based on the digitized version of the interference signal and based on the channel measurement, wherein the cancellation signal is calculated prior to the interference signal arriving at the interferee device; and applying the cancellation signal to an audio signal associated with the interferee device in order to remove the interference signal from the audio signal.

These and other features of the systems and methods for self-organized acoustic signal cancellation over a network according are described in the following detailed description, drawings, and appended claims.

DETAILED DESCRIPTION OF THE INVENTION

Figure 1:
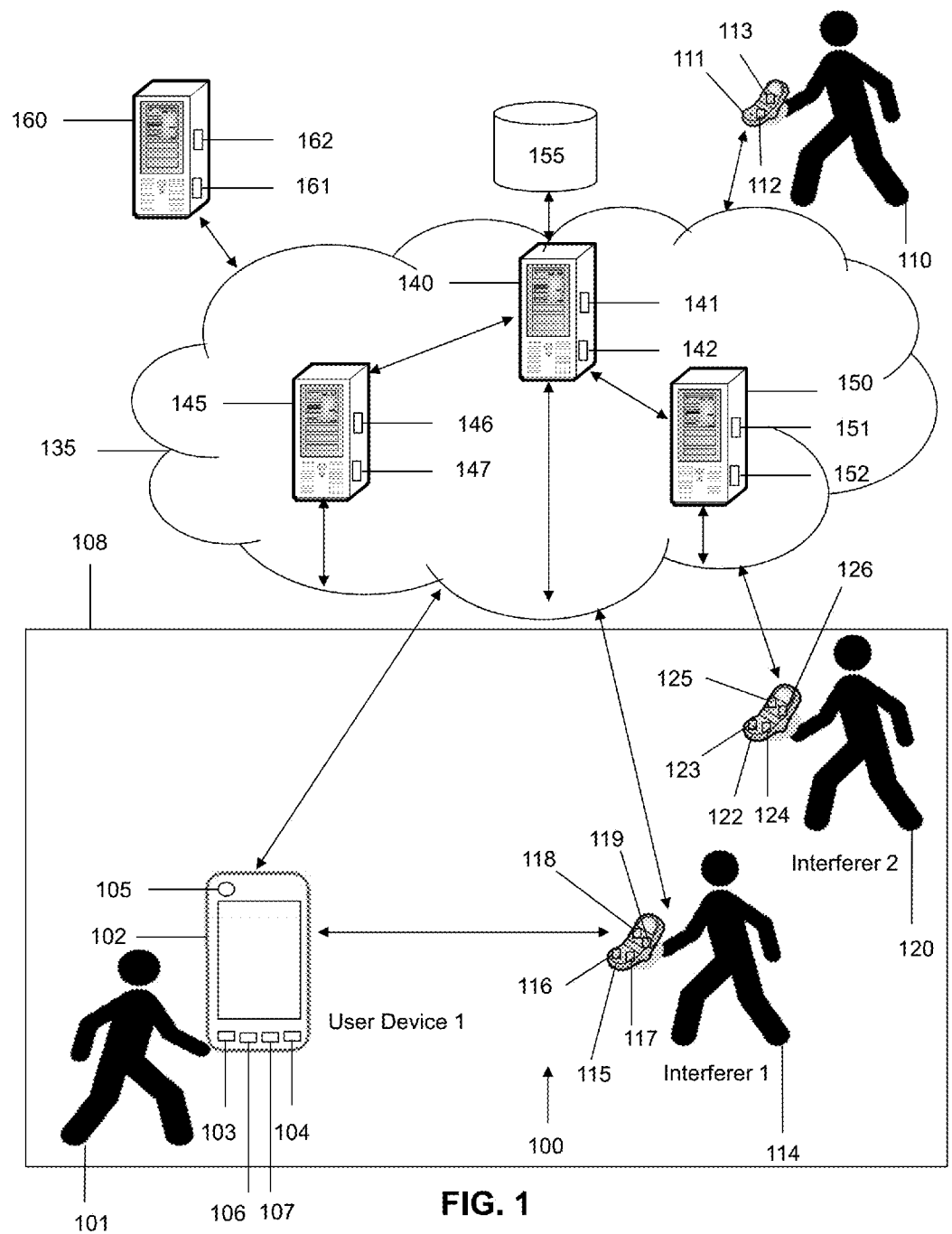
FIG. 1 is a schematic diagram of a system for self-organized acoustic signal cancellation over a network according to an embodiment of the present disclosure.
Figure 2:
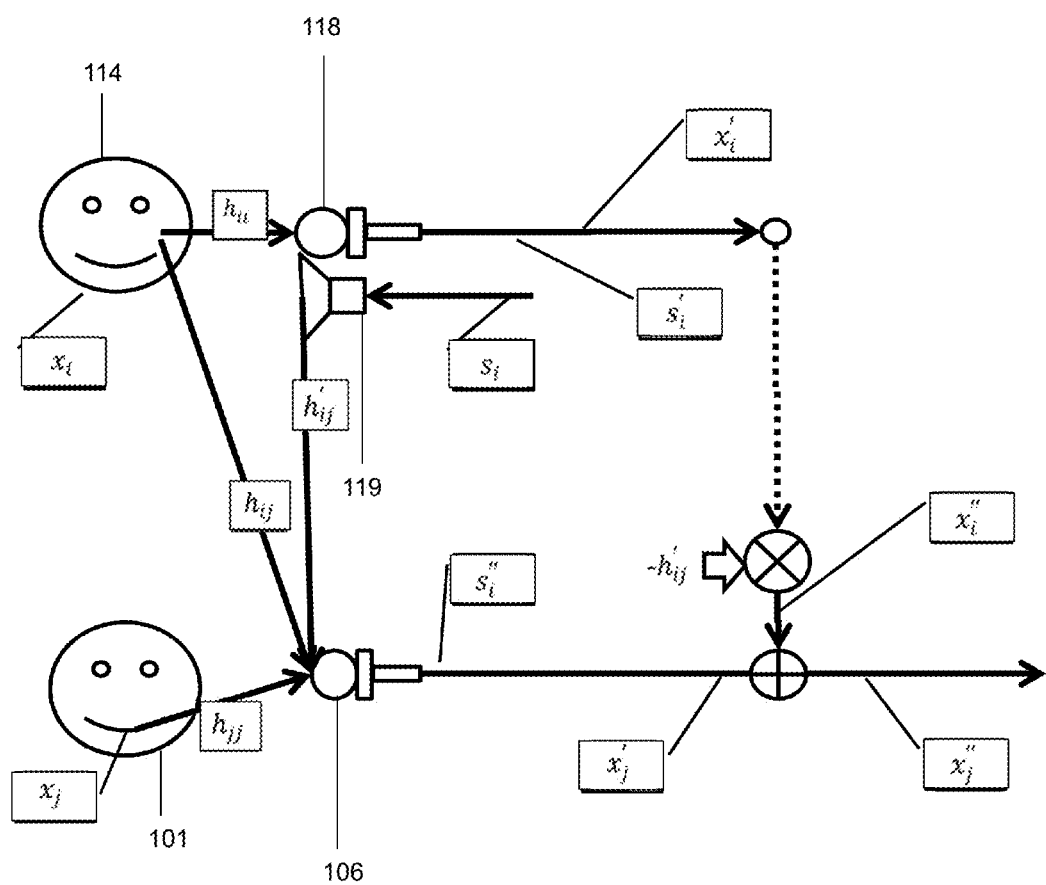
FIG. 2 is a schematic diagram illustrating further details of how the various components, signals, and communication channels of the system of FIG. 1 operate together to create and apply a cancellation signal.
Figure 3:
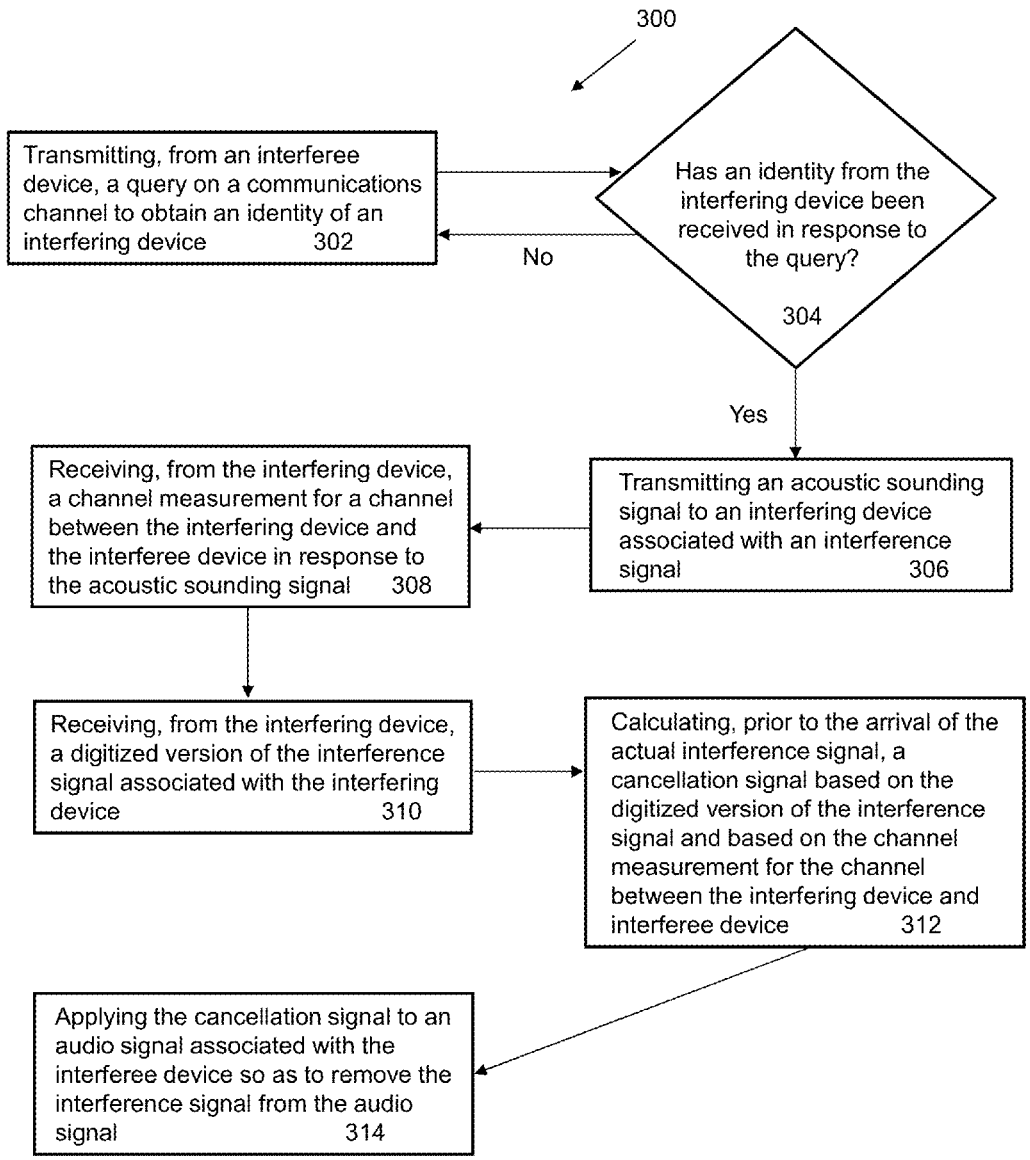
FIG. 3 is a flow diagram illustrating a sample method for self-organized acoustic signal cancellation over a network according to an embodiment of the present disclosure.

A system 100 and accompanying methods for self-organized acoustic signal cancellation over a network 135 are disclosed, as shown in FIGS. 1-3. In particular, the system 100 and methods may enhance communications via noise cancellation by taking advantage of the fact that electromagnetic waves propagate through air significantly faster than acoustic waves. In order to accomplish this, the system 100 and methods may enable an interferee device 102 of a user 101 to discover other nearby devices, such as interferer devices 115, 122, that may potentially interfere with communications associated with the interferee device 102. For example, the system 100 and methods may involve utilizing a protocol to enable each of the devices 102, 115, 122 to broadcast each of their identities on a communications channel to each other.

Once the identities are shared among the devices 102, 115, 122, the system 100 and methods may include transmitting an acoustic sounding signal to each of the interfering devices 115, 122 that may potentially interfere with the interferee device 102 of the user 101. Using the acoustic sounding signal, each of the potentially interfering devices 115, 122 may conduct a channel measurement for a channel between each interfering device 115, 122 and the interferee device 102 of the user 101. Once the channel measurements are conducted, each of the potentially interfering devices 115, 122 may transmit their corresponding channel measurements to the interferee device 102 of the user 101. Additionally, each of the potentially interfering devices 115, 122 may transmit digital versions of interference signals associated with each of the interfering devices 115, 122 to the interferee device 102 of the user 101.

After receiving the channel measurements and the digital versions of the interference signals, the system 100 and methods may include calculating cancellation signals based on the channel measurements and the digital versions of the interference signals. Notably, the calculation may be performed prior to the arrival of the actual analog interference signals at the interferee device 102 of the user. Once the calculations of the cancellation signals are performed, the system 100 and methods may include applying the cancellation signals to an audio signal associated with the interferee device 102 of the user so as to remove, or otherwise reduce, the effect of the actual interference signals on the audio signal. As a result, the system 100 and methods may enhance communications conducted between the interferee device 102 of the user 101 and a device 111 of another user 110.

As shown in FIG. 1, a system 100 for self-organized acoustic signal cancellation over a network 135 is disclosed. The system 100 may be configured to support, but is not limited to, supporting, content delivery services, communications services, automatic speech recognition services, telephone services, cloud computing services, voice-over-internet protocol services (VoIP), software as a service (SaaS) applications, gaming applications and services, productivity applications and services, mobile applications and services, and any other computing applications and services. The system 100 may include a user 101 that may utilize interferee device 102 to access content, data, and services to initiate and participate in communications sessions or to perform a variety of other functions. For example, the user 101 may utilize interferee device 102 to establish and handle a communications session, such as a telephone call, with user 110 that may be utilizing device 111.

In certain embodiments, the interferee device 102 and the device 111 may be computers, servers, mobile devices, smartphones, computer tablets, phablets, or any other computing devices. In one embodiment, the interferee device 102 may include a memory 103 that includes instructions, and a processor 104 that executes the instructions from the memory 103 to perform various operations that are performed by the interferee device 102. The processor 104 may be hardware, software, or a combination thereof. Additionally, the interferee device 102 may include a camera 105, which may be utilized to capture video, image, or other content. Furthermore, the interferee device 102 may also include a microphone 106 configured to receive audio signals and a speaker 107 configured to output audio signals. Similarly, the device 111 may include a memory 112 that includes instructions, and a processor 113 that executes the instructions from the memory 112 to perform various operations that are performed by the device 111. The processor 113 may be hardware, software, or a combination thereof.

The user 101 and the user 110 may utilize the interferee device 102 and the device 111, respectively, to communicate with each other. For example, the user 101 and user 110 may make telephone calls, conduct chat sessions, send instant messages, send or receive data, or perform any other types of communications with each other using the interferee device 102 and the device 111. Additionally, the user 101 and the user 110 may utilize the interferee device 102 and the device 111 to access and obtain various types of content and services, such as, but not limited to, video content, audio content, web content, text content, automatic speech recognition services, and other speech-related services. Additionally, users 101 and 110 may utilize the interferee device 102 and the device 111 to perform a variety of other tasks and functions. For example, the interferee device 102, the device 111, or both, may be utilized to conduct networked audio processing techniques, such as, but not limited to speech enhancement processing, acoustic cancellation, and other audio processing techniques. Furthermore, the interferee device 102, the device 111, or both, may be configured to monitor broadcast mediums, such as communications channels, between any of the devices or components in the system 100.

In certain embodiments, the interferee device 102, the device 111, or both, may include a software application that may be a cloud-based application, gaming application, an internet-based application, a speech recognition application, a browser application, a mobile application, a productivity application, a video application, a music application, a social media application, a financial application, a news application, any other type of application, or a combination thereof. In certain embodiments, the application may be utilized to provide noise cancellation and suppression services for the user 101 and 110. In certain embodiments, at least a portion of the software application may be configured to execute directly on the interferee device 102 and device 111, however, in other embodiments, the software application may be configured to execute on the other devices and components in the system 100.

The user 101 of the interferee device 102 may be in an environment 108, which may be any type of environment, such as, but not limited to, an office building, a park, an airport, a street, a movie theater, or any other type of environment. In certain embodiments, the user 110 may be in the same environment 108 as the user 101, however, in other embodiments, the user 110 may be in a different environment from user 101. Illustratively, user 110 is not located in the same environment 108 as user 101 in FIG. 1. The environment 108 may include ambient noise, and may also include one or more interferers, such as, but not limited to, interferer 114 and interferer 120. The interferers 114, 120 may be any type of object, person, or animal that may make noises or audio signals in the environment 108 that may potentially interfere with communications made by user 101, user 110, or both. In FIG. 1, interferer 114 and interferer 120 are people that are utilizing interfering devices 115 and 122 respectively.

The interfering devices 115, 122 may be computers, servers, mobile devices, smartphones, computer tablets, phablets, or any other computing devices. Illustratively, interfering devices 115 and 122 are shown as smartphones in FIG. 1. In one embodiment, the interfering device 115 may include a memory 116 that includes instructions, and a processor 117 that executes the instructions from the memory 116 to perform various operations that are performed by the interfering device 115. The processor 117 may be hardware, software, or a combination thereof. Additionally, the interfering device 115 may include a microphone 118 configured to receive audio signals and a speaker 119 configured to output audio signals generated or received by the interfering device 115. Similarly, the interfering device 122 may include a memory 123 that includes instructions, and a processor 124 that executes the instructions from the memory 112 to perform various operations that are performed by the interfering device 122. The processor 124 may be hardware, software, or a combination thereof. In certain embodiments, the interfering device 122 may include a microphone 125 configured to receive audio signals and a speaker 126 configured to output audio signals generated or received by the interfering device 122.

Interferers 114 and 120 may utilize the interfering devices 115 and 122, respectively, to engage in communications sessions with each other, other people, devices, or any combination thereof. As an example, interferers 114 and 120 may make telephone calls, conduct chat sessions, send instant messages, send or receive data, or perform any other types of communications with each other using the interfering devices 115 and 122 respectively. Also, the interferers 114, 120 may utilize the interfering devices 115, 122 to access and obtain various types of content and services, such as, but not limited to, video content, audio content, web content, text content, automatic speech recognition services, and other speech-related services. Additionally, the interfering devices 115, 122 may also be utilized to perform a variety of other tasks and functions. For example, the interfering device 115, the interfering device 122, or both, may conduct networked audio processing techniques, such as, but not limited to speech enhancement processing, acoustic cancellation, and other audio processing techniques. Furthermore, the interfering device 115, the interfering device 122, or both, may be configured to digitize audio signals, such as, but not limited to, analog acoustic interference signals that are generated by or otherwise associated with the interfering devices 115, 122. Moreover, the interfering device 115, the interfering device 122, or both, may be configured to monitor broadcast mediums, such as communications channels, between any of the devices or components in the system 100.

In certain embodiments, the interfering device 115, the interfering device 122, or both, may include a software application that may be a cloud-based application, gaming application, an internet-based application, a speech recognition application, a browser application, a mobile application, a productivity application, a video application, a music application, a social media application, a financial application, a news application, any other type of application, or a combination thereof. In certain embodiments, at least a portion of the software application may be configured to execute directly on the interfering devices 115, 122, however, in other embodiments, the software application may be configured to execute on the other devices and components in the system 100. Illustratively, the interferers 114, 120 are located in the same environment 108 as the user 101, however, other locations are also contemplated.

Notably, the functionality of the system 100 may be supported and executed by using any combination of the servers 140, 145, and 150 in the communications network 135 or outside of the communications network 135. In one embodiment, the server 140 may include a memory 141 that includes instructions, and a processor 142 that executes the instructions from the memory 141 to perform various operations that are performed by the server 140. Additionally, the server 145 may include a memory 146 that includes instructions, and a processor 147 that executes the instructions from the memory 146 to perform various operations that are performed by the server 145. Furthermore, the server 150 may include a memory 151 that includes instructions, and a processor 152 that executes the instructions from the memory 151 to perform various operations that are performed by the server 150. The processors 142, 147, and 152 may be hardware, software, or a combination thereof. In certain embodiments, the servers 140, 145, and 150 may be network servers, routers, gateways, computers, mobile devices or any other suitable computing device.

The communications network 135 of the system 100 may be configured to link each of the devices in the system 100 to one another, and be configured to transmit, generate, and receive any information and data traversing the system 100. In one embodiment, the communications network 135 may include any number of additional servers in addition to the server 140, the server 145, and the server 150. The communications network 135 may also include and be connected to a cloud computing network, a wireless network, an ethernet network, a satellite network, a broadband network, a cellular network, a private network, a cable network, the Internet, an internet protocol network, a multiprotocol label switching (MPLS) network, a content distribution network, a short-range wireless network (e.g. Bluetooth), a fiber optic network, a WiFi network, or any combination thereof. In one embodiment, the communications network 135 may be part of a single autonomous system that is located in a particular geographic region, or be part of multiple autonomous systems that span several geographic regions.

The database 155 of the system 100 may be utilized to store and relay information that traverses the system 100, cache content that traverses the system 100, store data about each of the devices in the system 100 and perform any other typical functions of a database. In one embodiment, the database 155 may be connected to or reside within the communications network 135. Additionally, the database 155 may include a processor and memory or be connected to a processor and memory to perform the various operation associated with the database 155. In certain embodiments, the database 155 may be connected to servers 140, 145, and 150, server 160, interferee device 102, device 111, interferer device 115, interferer device 122, or any combination thereof. The database 155 may also store communications traversing the system 100, store acoustic sounding signal information, store cancellation signal information, store identities for the devices in the system 100, store information about the interferers 114, 120, store user preferences, store information about the users 101, 110, store channel information for channels between any of the devices in the system 100, store channel measurement information, store any information traversing the system 100, or any combination thereof. Furthermore, the database 155 may be configured to process queries sent to it by any device in the system 100 or otherwise.

Operatively, the system 100 may provide for self-organized acoustic signal cancellation in the following manner. In an example scenario, the user 101 may utilize interferee device 102 to engage in a communications session, such as a telephone call, with user 110 that is using device 111. The environment 108 may include ambient noise and noises made by interferers 114, 120 and the interfering devices 115, 122 that may potentially interfere with the quality and perceptibility of the communications occurring during the communications session between users 101 and 110. In order to counteract such interfering noises occurring in the environment 108, the interferee device 102, the interferer device 115, the interferer device 122, or any combination thereof, may collaborate with each other to cancel out such noises and to enhance the communications occurring between the user 101 and the user 110.

In order to accomplish this, the user 101 may utilize the interferee device 102 to discover other nearby devices, particularly those in a vicinity of the user 101. For example, the interferee device 102 may be utilized to discover interferer device 115 and interferer device 122, which may be located in the same environment 108 as the user 101 and the interferee device 102. The interferee device 102 may discover nearby devices using a variety of different methods. For example, the broadcasting nature of wireless communication technologies may enable the interferee device 102 to discovery the nearby devices using wireless communications capabilities, such as, but not limited to, WiFi, Bluetooth, and other communications technologies. Through the discovery operations provided by such communications capabilities, the interferee device 102 may discover the interferer devices 115, 122 in its vicinity. For example, if the wireless signal strength received by the interferee device 102 for the interferer device 115 is stronger than the wireless signal strength received by the interferee device 102 for the interferer device 122, this may indicated that interferer device 115 is closer in proximity to interferee device 102 than interferer device 122.

In addition, the interferee device 102, the device 111, the interferer devices 115, 122, or any combination thereof, may collaborate with each other to obtain, or otherwise identify, the identities of each other. In certain embodiments, each of the devices may utilize audio-radio cooperation protocols or other desired protocols to obtain the identities from each of the other devices. For example, when utilizing an audio-radio cooperation protocol, the interferee device 102 may broadcast its own identity on a predetermined announcement channel at the same time the microphone 106 of the interferee device 102 detects an audio signal in the vicinity of the interferee device 102. The interferee device 102 may also broadcast its identity to other devices at other times. Nearby devices, such as the interferer devices 115, 122, which may be monitoring the announcement channel, may receive the identity of the interferee device 102 and the identities of any of any other devices that sent their identities over the announcement channel. Similarly, the interferee device 102 may also receive the identities of the interferer devices 115, 122 over the announcement channel from the interfering devices 115, 122 respectively. In addition to broadcasting their identities, the interferee device 102, the device 111, the interferer devices 115, 122, or any combination thereof, may announce their noise cancellation capabilities, speech enhancement capabilities, audio processing capabilities, or other capabilities to each other.

In certain embodiments, if the interferee device's 102 microphone 106 detects an increase in noise level within a given period of time after an identity is received over the announcement channel, the device corresponding to the identity may be deemed as a potential interferer by the interferee device 102. In certain embodiments, the system 100 may determine that a device may be a potential interferer by virtue of the fact that the device is located in proximity with the interferee device 102, that the device has been previously identified as an interferer, or any combination thereof. Each potential interferer may be associated with, generate, or transmit interference signals that may be potentially interfere with communications between the user 101 and the user 110. For each device deemed as a potential interferer, the interferee device 102 may attempt to conduct channel measurement with each such potential interferer.

In FIG. 2, several example channels and signals for use in conducting channel measurement and signal cancellation are illustrated. In this example, caller j is the interferee user 101 and caller i is the interferer 114. Channel $h_{ij}$ may represent the channel from the interferer's 114 mouth to the microphone 106 of the interferee device 102, channel $h_{jj}$ may represent the channel from the mouth of the user 101 to the microphone 106 of the interferee device 102, and channel $h'_{ij}$ may represent the channel from the speaker 119 of the interfering device 115 to the microphone 106 of the interferee device 102. The interferer's 114 original outgoing interference signal may be represented by $x_i$, the interferer's 114 interference signal as received by the microphone 118 of the interfering device 115 may be represented by $x'_i$, and the cancellation signal for cancelling the interference signal may be represented by $x''_i$. Additionally, the interferee user's 101 outgoing signal may be represented by $x_j$, the interferee user's 101 signal as received by the microphone 106 of the interfering device 102 may be represented by $x'_j$, and the interferee user's 101 signal after application of the cancellation signal may be represented by $x''_j$. Furthermore, an original channel sounding signal may be represented by $s_i$, the sounding signal as received by the interferer's 114 microphone 118 may be represented by $s'_i$, and the sounding signal as received by the microphone 106 of the interferee device 102 may be represented by $s''_i$.

The channel measurements may be performed by utilizing a series of acoustic sounding signals, such as $s_i$, which may be known to the interferee device 102. In certain embodiments, $s_i$ may be an original acoustic sounding signal, and the series of acoustic sounding signals may be a single tone sound that is utilized at different frequencies. In certain embodiments, the sounding signals may be pre-agreed between the interferee device 102 and the interfering devices 115, 122. In other embodiments, the sounding signals may be selected by the interferee device 102, and then transmitted by the interferee device 102 to the interfering devices 115, 122. In order to discover the channels, the interfering device 115, for example, may play out the sounding signal $s_i$ over the speaker 119 of the interfering device 115. The sounding signal $s_i$ may then be picked up by the microphone 118 of the interfering device 115 and digitized as $s'_i$. The digitized signal $s'_i$ may be transmitted to the interfering device 115 over the communications network 135. In parallel, the sounding signal may also be propagated over the communications network 135 to the microphone 106 of the interferee device 102. The sound signal may be received at the microphone 106 of the interferee device 102 as $s''_i$. By comparing $s_i$, $s'_i$, and $s''_i$, the channel response $h'_{ij}$ may be calculated.

Once the channel response $h'_{ij}$ is calculated, the system 100 may begin conducting the noise cancellation on the undesired interference signals from the interferers 114, 120 on the interferee device's 102 outgoing signals. In order to do so, the system 100 may estimate the interference signal by calculating the received interference signal of $x_i$ by applying the negation of the measured channel $h'_{ij}$. The estimation may be performed by the utilizing the following formulaic process: $x''_i = -x'_i * h'_{ij}$. Using this formula, the interferee's 101 original signal $x_j$, when mixed with the interferer's interference signal, and after going through the interferee user's 101 microphone 106 may be represented as: $x'_j = x_j * h_{jj} + x_i * h_{ij}$. By combining this signal with the calculated cancellation signal, the final signal leaving caller j may be represented by the following formula: $x'_j = x'_j + x''_i = x_j * h_{jj} + x_i h_{ij} - x'_i * h'_{ij}$. Assuming the microphone 106 of the interferee device 102 is placed in proximity to the mouth of the interferee user 101, then $h_{ij} \approx h'_{ij}$ and $x_i \approx x'_i$. As a result, $x'_j \approx x_j * h_{jj}$. Thus, the effect of the interference signal $x_i$ is removed from the interferee's signal $x'_j$ that is sent to user 110, and the interferee user 101 may engage in enhanced communications with user 110 that are not affected by the interferee 114's interference signals. The same process above may be utilized for interference signals generated by interferer 120 or any other potential interferer.

In certain embodiments, the quality of the interference signal removal may depend on the quality of the estimation for channel $h_{ij}$. While the total processing delay of interference signal processing (i.e. digitization of the interference signal at the interfering device 115, communication of the digitized interference signal to the interferee device 102, and the interferee device's 102 calculation of the cancellation signal) may need to be small, the amount of such delay may already be factored in the channel measurement process. Additionally, the variance of the additional delay introduced by the interference signal processing may be within the tolerance level of the audio cancellation. In certain embodiments, the system 100 may repeat the channel measurement process periodically or on-demand to improve the estimation. In further embodiments, when the interferer's 115 communications and the interferee user's 101 communications go through a common platform, such as cloud-computing network, some or all of the cancellation processing steps may be performed in the cloud-computing network if the delay stability constraint can be satisfied.

Notably, as shown in FIG. 1, the system 100 may perform any of the operative functions disclosed herein by utilizing the processing capabilities of server 160, the storage capacity of the database 155 or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, transmitting queries on a communications channel to obtain the identities of potential interferers, determining if an identity of a potential interferer has been received, transmitting acoustic sounding signals, performing and receiving channel measurements for channels between the interferee device 102 and interferer devices 115, 122, digitizing interference signals, calculating cancellation signals, applying the cancellation signals to audio signals, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including an interferee device 102, a device 111, an interferer device 115, an interferer device 122, a communications network 135, a server 140, a server 145, a server 150, a server 160, and a database 155. However, the system 100 may include multiple interferee devices 102, multiple devices 111, multiple interferer devices 115, 122, multiple communications networks 135, multiple servers 140, 145, 150, and 160, multiple databases 155, or any number of any of the other components in the system 100. Furthermore, in one embodiment, substantial portions of the functionality and operations of the system 100 may be performed by other networks and systems that may be connected to system 100.

As shown in FIG. 3, an exemplary method 300 for self-organized acoustic signal cancellation over a network 135 is schematically illustrated, and may include, at step 302, transmitting a query on one or more communications channels to obtain identities of potentially interfering devices that are in a vicinity of an interferee device 102. An identity may include, but is not limited to, an internet protocol address, a media access control address, a unique identifier associated with a device, any other identifier, or any combination thereof. The potentially interfering devices may be devices that generate, output, or are otherwise associated with interference signals that may potentially interfere with communications of the interferee device 102. In certain embodiments, the query may be transmitted by utilizing the interferee device 102, the device 111, the servers 140, 145, 150, 160, any combination thereof, or by any other appropriate device. At step 304, the method 300 may include determining if an identity from a potentially interfering device, such as interfering device 115, has been received in response to the query. In certain embodiments, the determining may be performed by utilizing the interferee device 102, the device 111, the servers 140, 145, 150, 160, any combination thereof, or by any other appropriate device.

If the identity from the potentially interfering device is not received, a potentially interfering device is not in the vicinity of the interferee device 102, or both, the method 300 may include reverting back to step 302 to so that another query may be transmitted on one or more communications channels to obtain the identities of potentially interfering devices. If, however, an identity of a potentially interfering device is received, the method 300 may include transmitting an acoustic sounding signal to each potentially interfering device at step 306. In certain embodiments, the acoustic sound signal may be transmitted by utilizing the interferee device 102, the device 111, the interfering devices 115, 122, the servers 140, 145, 150, 160, any combination thereof, or by any other appropriate device. At step 308, the method 300 may include receiving, in response to the acoustic sounding signal, a channel measurement from each potentially interfering device for each channel between each potentially interfering device and the interferee device 102. In certain embodiments, the channel measurements may be received by the interferee device 102, the device 111, the servers 140, 145, 150, 160, any combination thereof, or by any other appropriate device.

At step 310, the method 300 may include receiving a digitized version of an interference signal associated with the potentially interfering device. In certain embodiments, the interference signal may be a signal, such as an audio or acoustic signal, that may potentially interfere with communications that are conducted using the interferee device 102, the device 111, or both. For example, the interference signal may be speech signal outputted by the potentially interfering device, a music signal outputted by the potentially interfering device, or any other type of audio signal outputted by the potentially interfering device. In certain embodiments, the digitized version of the interference signal may be digitized from the analog version of the interference signal, and may be sent to the interferee device 102 prior to the actual arrival of the analog version of the interference signal at the interferee device 102. However, in other embodiments, the digitized version of the interference signal may be digitized and sent at other desired times. In certain embodiments, the digitized version of the interference signal may be generated and transmitted by the interfering devices 115, 122, the servers 140, 145, 150, 160, any combination thereof, or by any other appropriate device. The digitized version of the interference signal may be received by the interferee device 102, the device 111, the servers 140, 145, 150, 160, any combination thereof, or by any other appropriate device.

Once the digitized version of the interference signal is received, the method 300 may include, at step 312, calculating a cancellation signal based on the digitized version of the interference signal, based on the channel measurement for each channel between each potentially interfering device and the interferee device 102, or a combination thereof. In a preferred embodiment, the calculation signal may be calculated prior to the actual arrival of the analog version of the interference signal at the interferee device 102. In certain embodiments, the cancellation signal may be calculated by the interferee device 102, the device 111, the servers 140, 145, 150, 160, any combination thereof, or by any other appropriate device. At step 314, the method 300 may include applying the cancellation signal to a signal, such as an audio signal, associated with the interferee device 102 so as to remove the interference signal from the signal associated with the interferee device 102. For example, if the signal associated with the interferee device 102 is speech of the user 101, the cancellation signal may be applied to the speech so as to remove any potential interference that the interference signal associated with the potentially interfering device may cause. As a result, the signal associated with the interferee device 102 may be sent to the device 111, and the user 110 may hear the signal from the interferee device 102 without the effects of the interference signal. For each interference signal that may potentially interfere with the communications held between the user 101 and the user 110, the method 300 may be utilized to remove the effects of such interference signals so as to enhance communications between the users 101, 110. Notably, the method 300 may incorporate any of the functionality of the system 100 or any other functionality described in the present disclosure.

Notably, the system 100 and methods disclosed herein may include additional functionality and features. Based on the broadcasting nature of wireless communications, setup and channel measurement operations may be conducted in a peer-to-peer fashion, self-organized fashion, or any combination thereof. For example, the interferee device 102, the device 111, and the interfering devices 115, 122 may collaborate with each other and may periodically announce each of their capabilities over a broadcast medium, such as, but not limited to, a wireless communications channel that each of the devices are monitoring or are otherwise in communication with. Additionally, a device, such as the interferee device 102 or other appropriate device in the system 100, may use the communications channel to announce any upcoming channel measurement acoustic signals. As an example, the interferee device 102 may send an announcement that declares a single tone acoustic signal of a selected frequency to be sent out after a selected time period. In certain embodiments, the announcement may declare a series of tones associated with a set of frequencies. In other embodiments, the single tone acoustic signal or the series of acoustic signals may be declared and sent with the identity of the announcer, which, in this example, may be the interferee device 102.

Upon receiving such an announcement over the communications channel, the other devices that are monitoring the communications channel may perform channel measurements by getting ready to receive and measure the acoustic signals provided by the announcer. When experiencing acoustic interference, the interferee device 102 may transmit a query on the communications channel that seeks the identity of the interferer. Once the interferer replies using the interfering device 115 and provides the identity, the interferee device 102 may retrieve the interfering device's 115 corresponding channel measurement. The interferee device 102 may then proceed to use the channel measurement result to generate cancellation signals that may be utilized to cancel future interference signals generated or outputted by the interfering device 115, interferer 114, or both.

In certain embodiments, the operations of channel discovery, performing channel measurements, obtaining identities, conducting noise cancellations, or any of the other operations of the system 100, may be performed in a cloud-based network, which may be communications network 135. Using this approach, each of the devices may be made aware of all the other devices located in a selected vicinity. The cloud-based network may be made aware of all the devices and may process all captured signals traversing the system 100, such as interference signals or other signals. In such an embodiment, the interferee device 102, the device 111, the interfering devices 115, 122 may not need to be configured with software that performs the operations of channel discovery, performing channel measurements, obtaining identities, conducting noise cancellations, or other selected operations of the system 100 because such operation may be performed using the cloud-based network.

In certain other embodiments, each interfering device 115, 122 may collaborate with the interferee device 102, or even the device 111, to discover the response of each of the communications channels between each of the devices involved in the collaboration. Furthermore, in certain embodiments, the system 100 and methods may include enabling the interference signal to be digitized by the interfering devices 115, 122 when the user 101 has initiated a communications session using the interferee device 102, when the communications session is in the process of being established, when the interferee device 102 is actively engaged in the communications session, or at any other selected time. In still further embodiments, a list of interfering devices 115, 122 that are previously known to be interferers may be generated and utilized to automatically determine that a particular device in the system 100 is an interferer.

Figure 4:
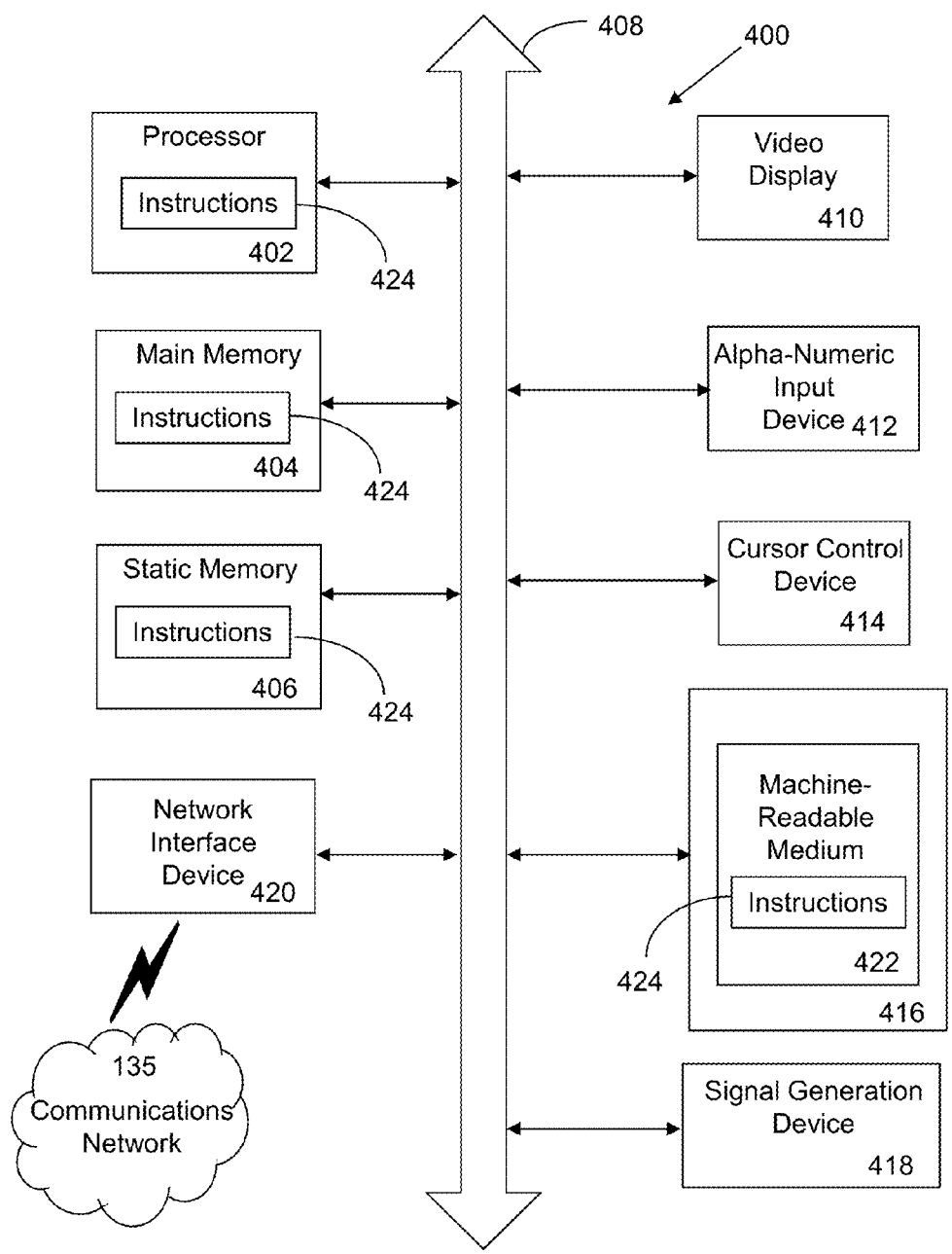
FIG. 4 is a schematic diagram of a machine in the form of a computer system within which a set of instructions, when executed, may cause the machine to perform any one or more of the methodologies or operations of the systems and methods for self-organized acoustic signal cancellation over a network.

Referring now also to FIG. 4, at least a portion of the methodologies and techniques described with respect to the exemplary embodiments of the system 100 can incorporate a machine, such as, but not limited to, computer system 400, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines, such as, but not limited to, the interferee device 102, the device 111, the interferer device 115, the interferer device 122, the server 140, the server 145, the server 150, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410, which may be, but is not limited to, a liquid crystal display (LCD), a flat panel, a solid state display, or a cathode ray tube (CRT). The computer system 400 may include an input device 412, such as, but not limited to, a keyboard, a cursor control device 414, such as, but not limited to, a mouse, a disk drive unit 416, a signal generation device 418, such as, but not limited to, a speaker or remote control, and a network interface device 420.

The disk drive unit 416 may include a machine-readable medium 422 on which is stored one or more sets of instructions 424, such as, but not limited to, software embodying any one or more of the methodologies or functions described herein, including those methods illustrated above. The instructions 424 may also reside, completely or at least partially, within the main memory 404, the static memory 406, or within the processor 402, or a combination thereof, during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 422 containing instructions 424 so that a device connected to the communications network 135, other network, or both, can send or receive voice, video or data, and to communicate over the communications network 135, other network, or both, using the instructions. The instructions 424 may further be transmitted or received over the communications network 135, other network, or both, via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
    a memory that stores instructions;
    a processor that executes the instructions to perform operations, the operations comprising:
        transmitting an acoustic sounding signal to an interfering device, wherein the acoustic sounding signal is utilized to perform a channel measurement for a channel between the interfering device and an interferee device, and wherein the interfering device is associated with an interference signal;
        receiving, from the interfering device, the channel measurement for the channel between the interfering device and the interferee device;
        receiving a digitized version of the interference signal associated with the interfering device;
        calculating a cancellation signal based on the digitized version of the interference signal and based on the channel measurement, wherein the cancellation signal is calculated prior to the interference signal arriving at the interferee device; and
        applying the cancellation signal to an audio signal associated with the interferee device in order to remove the interference signal from the audio signal.

2. The system of claim 1, wherein the operations further comprise receiving an identity of the interfering device via the channel between the interfering device and the interferee device.

3. The system of claim 2, wherein the operations further comprise verifying that the interfering device is an interferer when an increase in noise level is detected within a period of time of receiving the identity of the interfering device.

4. The system of claim 1, wherein the operations further comprise applying the cancellation signal to the audio signal when the interference signal arrives at the interferee device.

5. The system of claim 1, wherein the operations further comprise transmitting, to the interfering device, an identity of the interferee device via the channel between the interfering device and the interferee device.

6. The system of claim 1, wherein the operations further comprise discovering the channel between the interfering device and the interferee device.

7. The system of claim 1, wherein the acoustic sounding signal comprises a single tone sound at a frequency selected by the interferee device.

8. The system of claim 1, wherein the operations further comprise transmitting the acoustic sounding signal to the interferee device.

9. The system of claim 1, wherein the operations further comprise estimating a plurality of acoustic signals generated by additional interfering devices as they are received by the interfering device.

10. A method, comprising:
    transmitting an acoustic sounding signal to an interfering device, wherein the acoustic sounding signal is utilized to perform a channel measurement for a channel between the interfering device and an interferee device, and wherein the interfering device is associated with an interference signal;
    receiving, from the interfering device, the channel measurement for the channel between the interfering device and the interferee device;

receiving a digitized version of the interference signal associated with the interfering device;

calculating, by utilizing instructions from memory that are executed by a processor, a cancellation signal based on the digitized version of the interference signal and based on the channel measurement, wherein the cancellation signal is calculated prior to the interference signal arriving at the interferee device; and applying the cancellation signal to an audio signal associated with the interferee device in order to remove the interference signal from the audio signal.

11. The method of claim 10, further comprising receiving an identity of the interfering device via the channel between the interfering device and the interferee device.

12. The method of claim 11, further comprising verifying that the interfering device is an interferer when an increase in noise level is detected within a period of time of receiving the identity of the interfering device.

13. The method of claim 10, further comprising applying the cancellation signal to the audio signal when the interference signal arrives at the interferee device.

14. The method of claim 10, further comprising transmitting, to the interfering device, an identity of the interferee device via the channel between the interfering device and the interferee device.

15. The method of claim 10, further comprising discovering the channel between the interfering device and the interferee device.

16. The method of claim 10, further comprising transmitting the acoustic sounding signal to the interfering device, wherein the acoustic sounding signal comprises a single tone sound at a frequency selected by the interferee device.

17. The method of claim 10, further comprising transmitting the acoustic sounding signal to the interferee device.

18. The method of claim 10, further comprising estimating a plurality of acoustic signals generated by additional interfering devices as they are received by the interfering device.

19. A computer-readable device comprising instructions, which when executed by a processor, cause the processor to perform operations comprising:

transmitting an acoustic sounding signal to an interfering device, wherein the acoustic sounding signal is utilized to perform a channel measurement for a channel between the interfering device and an interferee device, and wherein the interfering device is associated with an interference signal;

receiving, from the interfering device, the channel measurement for the channel between the interfering device and the interferee device;

receiving a digitized version of the interference signal associated with the interfering device;

calculating a cancellation signal based on the digitized version of the interference signal and based on the channel measurement, wherein the cancellation signal is calculated prior to the interference signal arriving at the interferee device; and applying the cancellation signal to an audio signal associated with the interferee device in order to remove the interference signal from the audio signal.

20. The computer-readable device of claim 19, wherein the operations further comprise further comprising verifying that the interfering device is an interferer when an increase in noise level is detected within a period of time of receiving an identity of the interfering device.

* * * * *